Feb. 28, 1928.
C. E. BYDE
1,660,862
APPARATUS FOR GRADING RAISINS AND THE LIKE
Filed June 17, 1925
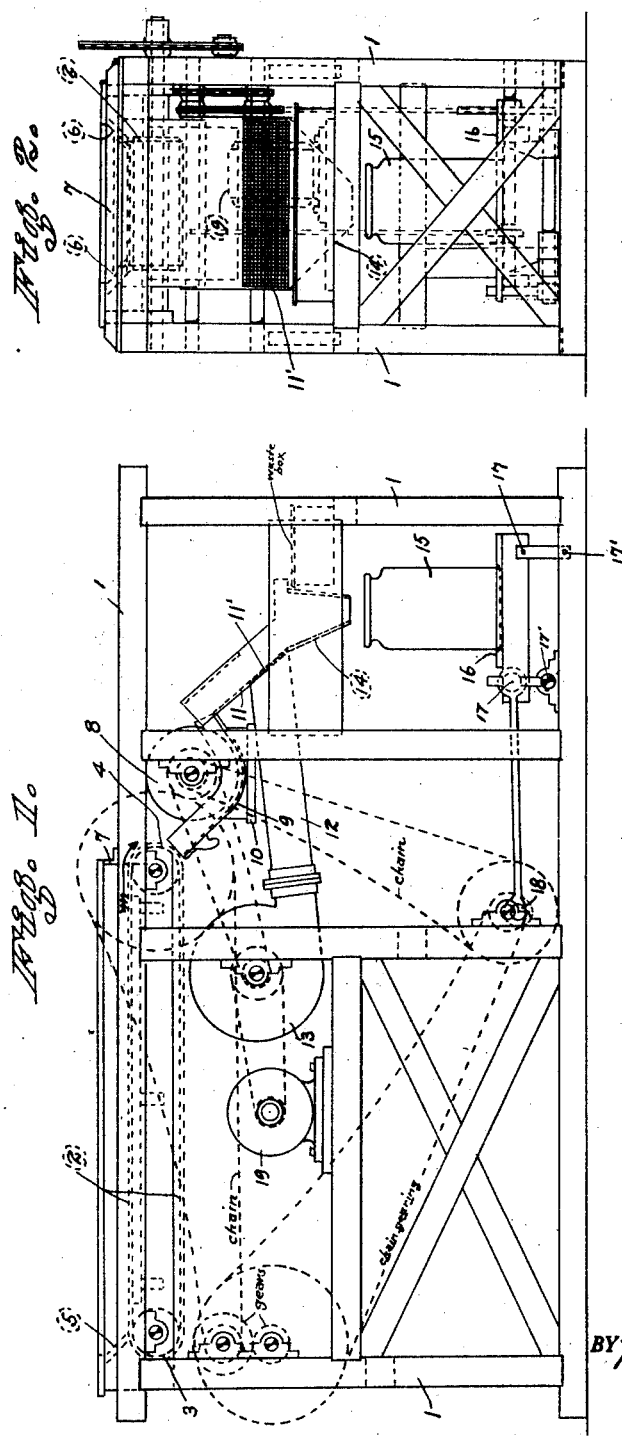
INVENTOR.
Clarence E. Byde.
BY Miller Henry & Boykin
ATTORNEYS.

Patented Feb. 28, 1928.

1,660,862

UNITED STATES PATENT OFFICE.

CLARENCE E. BYDE, OF FOWLER, CALIFORNIA, ASSIGNOR TO SUN-MAID RAISIN GROWERS OF CALIFORNIA, OF FRESNO, CALIFORNIA, A COOPERATIVE ASSOCIATION.

APPARATUS FOR GRADING RAISINS AND THE LIKE.

Application filed June 17, 1925. Serial No. 37,708.

This invention relates to the grading of dried fruits, especially raisins, currants and the like, has for its object a better method of determining the grade or value of a consignment of such fruits than the methods heretofore in use.

Before going into the features of my improved method, attention is called to the fact that raisins, in common with other dried fruits have generally been graded principally by size, tho in the case of raisins the sugar content has sometimes been considered as well and appropriate tests made of the various consignments in order to determine this.

Also, since raisins, especially the small ones of the Thompson Seedless variety vary somewhat in appearance or visual attractiveness it has been customary in some plants to pass upon the product of the different growers as received by the packers, by an expert raisin inspector whose years of experience was relied upon to classify the consignments into proper grades through a visual examination of each of the boxes in each lot.

It has been felt by the trade that these methods were unsatisfactory and unscientific especially the visual inspection so much relied upon, or its combination with the other two tests mentioned, and accordingly there has been a demand for a scientific method of approximating the value of each lot which would be free from reliance on the human factor and therefore impartial in respect to both the seller and buyer, and at the same time such a method which could be cheaply and quickly applied to test a given consignment of raisins.

The method which I have discovered for grading raisins and the like as described herein and found practicable and satisfactory to all parties, is based not on the size of the raisins, nor on their sugar content, nor on visual inspection, nor any combination of these, the only methods heretofore used, but is based on determining the weight of a unit bulk of cleaned raisins representing an average of the lot to be tested.

In further explanation, a small quantity of raisins such as a scoopful is taken from each of the boxes of a lot received from a grower so as to be representative of the consigment, these are passed through apparatus to clean them and run them into a unit volume container—under exactly controlled conditions so that the unit volume will represent a quantity of dried clean raisins of minimum interstices, and of a pressure due to their own weight only.

This unit volume is then weighed and its weight constitutes the index of the grade— the heavier the weight of the unit volume the higher the grade, and vice versa.

To successfully carry out this method the raisins must be of substantially uniform dryness, and the test quantity must be cleaned of the stems and dirt and uniformly fed into the unit volume container.

Apparatus to carry out the mechanical steps of the method is shown in the accompanying drawings tho it is desired to state here that the invention being primarily a method, the apparatus shown is more in the nature of a diagram as any apparatus which will carry out the necessary mechanical steps of the method comes within the spirit of the invention and is intended to be covered in the claims.

Fig. 1 is a side elevation of the complete apparatus.

Fig. 2 is an end elevation from the right of Fig. 1.

In the drawings 1 represents a horizontally arranged frame conveniently of about five feet in height when on the floor and supporting along its upper portion a short belt conveyor 2 running over rollers 3 and 4.

Above the upper run of belt is arranged a trough or hopper formed of a slanted end 5 and sides 6 for receiving the raisins to be tested so that they will be deposited on the belt for conveying therealong, and at the discharge end of the conveyor is an angle iron cross bar 7 spaced above the belt forming a gate or gage so as to provide beneath it a slot or restricted space above the belt for egress of a definite layer of raisins with the moving belt.

The conveyor feeds a definite amount or layer of raisins through the gate to a suitable stemming device here indicated as a perforated drum 8 revolving adjacent a curved perforated plate 9 and between which plate and drum the raisins are carried by the rotation of the drum thus breaking off the stems and loosening any adhering dirt or foreign matter.

Some of the removed matter passes through the perforated plate 9 and may be removed from time to time by emptying the drawer 10 arranged beneath the stemmer, while stems and matter carried along with the raisins passes over a chute 11 having a portion of its bottom of screen construction as indicated at 11'.

As the raisins pass over the screen 11' a blast of air is forced through them from a pipe 12 extending to the under side of the screen from a blower 13, and whereby the remaining dirt and stems are blown clear of the raisins which pass on down to a funnel 14 under which is positioned the unit volume container 15.

This unit volume container may be of any standard capacity desired but in practice a container holding 5 standard U. S. gallons has been found satisfactory.

The unit volume container while receiving the raisins from the chute is supported on a rocking or jarring base 16 of which various forms may be constructed but which is here shown as a platform pivoted at 17—17' at both ends and vibrated or jarred in a uniform manner by means of a revolving eccentric 18 connected at one end.

The various working elements described are driven at relative speeds found best in practice all from a common source of power such as a motor 19 mounted on the frame and preferably positively connected to the various elements by chain gearing as indicated so that after a quantity of raisins to be test graded are dumped upon the belt and confined within the trough the feed of raisins to the stemmer will be uniform, the stemming and cleaning uniform, the stream of cleaned raisins to the container perfectly uniform, and the jarring of the container will be uniformly maintained so that the interstices in the raisins will be reduced to the minimum and a unit-volume of raisins of absolutely uniform density will be obtained each time under precisely duplicate conditions—and after which the unit-contents of the container is weighed to determine its grade.

This latter operation may of course be done either on the machine or the container may be levelled off with a suitable scraper and the weighing done as a separate and final operation.

The method above described, while particularly adapted for raisins, is also applicable to other products of similar nature wherein the older methods of testing or establishing the grade have been found unsatisfactory and so far as I am aware it constitutes an entirely novel method and has proven thoroughly practicable in the raisin industry.

The appended claims are drawn to the special arrangement of apparatus to carry out the process, and a divisional application hereof filed under Serial No. 192,026 contains claims to the method involved.

I claim:

1. In an apparatus for the grading of dried fruits, means for feeding the fruit at a substantially uniform rate of speed, a unit volume container arranged to receive the fruit so fed, means for jarring the unit-volume container while receiving the fruit, and transmission mechanism arranged to operate both of said means simultaneously.

2. In an apparatus for the grading of dried fruits, means for feeding the fruit at a substantially uniform rate of speed, means for cleaning the fruit while in transit, a unit-volume container arranged to receive the cleaned fruit, means for jarring the unit-volume container while receiving the fruit, and transmission mechanism arranged to operate all of said means simultaneously.

3. In an apparatus for the grading of dried fruits, means for feeding the fruit at a substantially uniform rate of speed, means for cleaning the fruit while in transit, a unit-volume container arranged to receive the cleaned fruit, means for jarring the unit-volume container while receiving the fruit geared to work in predetermined relation to the speed of feeding the fruit, and transmission mechanism arranged to simultaneously operate all of said means at a constant speed relation.

4. In an apparatus for the grading of dried fruit, a horizontally disposed conveyor, a hopper thereover for feeding the conveyor with fruit, a gage adapted to control the amount of fruit carried away on the conveyor, means for continuously removing foreign matter from the fruit so carried away, a unit-volume container arranged to receive the cleaned fruit, means for settling the fruit within the container, and transmission mechanism arranged to simultaneously operate said conveyor and both of said means at a constant speed relation.

5. In an apparatus for grading raisins, a frame, a horizontally arranged belt conveyor supported on the frame, a hopper over the belt conveyor arranged to feed a supply of raisins thereto, a gage at the discharge end of the conveyor adapted to control the layer of raisins carried away by the conveyor, a stemmer arranged to receive the layer of raisins from the belt, a perforated chute to which the stemmed raisins are delivered from the stemmer, means for creating a blast of air through the perforations and raisins passing over the chute, a unit-volume container arranged to receive the raisins from the chute, a device adapted for jarring the unit-volume container while receiving the fruit, and transmission mechanism arranged for simultaneously operating the conveyor, stemmer, blast and jarring device at a constant speed relation..

CLARENCE E. BYDE.